United States Patent
Mori et al.

[11] Patent Number: 5,105,899
[45] Date of Patent: Apr. 21, 1992

[54] REAR WHEEL STEERING ANGLE CONTROL SYSTEM FOR VEHICLES

[75] Inventors: Kazunori Mori; Namio Irie, both of Kanagawa, Japan

[73] Assignee: Nissan Motor Company, Limited, Yokohama, Japan

[21] Appl. No.: 419,161

[22] Filed: Oct. 10, 1989

[30] Foreign Application Priority Data

Oct. 8, 1988 [JP] Japan .................. 63-252922

[51] Int. Cl.$^5$ .............................. B62D 7/14
[52] U.S. Cl. ..................... 180/140; 180/143; 280/91; 364/424.01
[58] Field of Search ......... 180/140, 142, 143; 280/91; 364/424, 424.01

[56] References Cited

U.S. PATENT DOCUMENTS 4,705,135 11/1987 Kawamoto et al. ............... 180/143
4,706,771 11/1987 Kawabe et al. ................... 180/140

FOREIGN PATENT DOCUMENTS 3816486 12/1988 Denmark ............................ 180/140
363846 4/1990 European Pat. Off. .
175179 8/1986 Japan .................................. 180/140
175574 7/1989 Japan .................................. 180/140

*Primary Examiner*—Mitchell J. Hill
*Attorney, Agent, or Firm*—Foley & Lardner

[57] ABSTRACT

A system for controlling the steering angle for the rear wheels of a vehicle is provided. This system includes an angle sensor for sensing a steered angle, steered angular velocity, and steered angular acceleration, a vehicle speed sensor, and a steering angle controller. The steering angle controller is adapted for controlling steering of the rear wheels so as to vary the position where the side slip angle of the vehicle becomes zero with respect to the center of gravity based on the steered angle, steered angular velocity, steered angular acceleration, and vehicle speed to improve manoeuverability of the vehicle in cornering.

8 Claims, 3 Drawing Sheets

REAR WHEEL STEERING ANGLE CONTROL SYSTEM FOR VEHICLES

BACKGROUND OF THE INVENTION

1. Technical Field

The present invention relates generally to a system for controlling the steering angle of the rear wheels of a vehicle. More particularly, the invention relates to a system for controlling the steering angle of the rear wheels based on a steering operation by a driver.

2. Background Art

A system adapted for controlling the steering of the rear wheels of a vehicle is well known in the art. For example, Japanese Utility Model First Publication (jikkaisho) No. 62-23773 discloses a system which controls the rear wheel steering angle based on vehicle speed. In this system, when the vehicle is running at a constant speed, the ratio of the front wheel steering angle $\delta f$ to the rear wheel steering angle $\delta r$ is a constant. This results in improved traveling stability went the vehicle turns a steady circle. There is however a problem in that the responsiveness of the vehicle to emergency handling for better vehicle handling while slaloming is not so good.

SUMMARY OF THE INVENTION

It is accordingly an object of the present invention to provide an apparatus for controlling the rear wheel steering angle to obtain driving stability regardless of variations in the turning circle or the magnitude of the turning circles which the vehicle encounters.

According to one aspect of the present invention, there is provided an apparatus for controlling the rear wheel steering angle for a vehicle which comprises a first sensing the following three parameters means for sensing a steered angle, steered angular velocity, and steered angular acceleration of the steering wheel of the vehicle and to provide signals indicative thereof, a second sensing means for sensing vehicle speed to provide a signal indicative thereof, a third means for determining a target steering angle for a rear wheel so as to vary the position where the side slip angle of the vehicle becomes zero with respect to the vehicle's center of gravity based on the signals from the first sensing means and the second sensing means to improve the maneuverability of the vehicle in cornering, and a fourth means for controlling the actual steering angle for the rear wheels according to the target steering angle to achieve stable cornering.

In the preferred mode, the third means determines the target steering angle $\delta r$ so as to satisfy the following relation with respect to a steered angle $\delta f$ of the front wheel.

$$\delta r / \delta f = K + \tau \cdot S + \tau' \cdot S^2$$

where
S: a Laplace's operator
$K = C_1 \{aMV^2 + C_2 l(l_3 - b)\} / C_2 \{bMV^2 + C_1 l(l_3 - a)\}$
$\tau = T1 + K(T - T2)$
$T' = T1(T - T2)$
$T1 = C_1 V(aMl_3 - I) / C_2 \{bMV^2 + C_1 l(l_3 + a)\}$
$T2 = V(bMl_3 = I) / bMV^2 = C_2 l(l_3 + a)$
M: vehicle weight
I: yaw moment of inertia
l: wheel base
$l_3$: distance between the center of gravity and a position where the lateral slip angle becomes zero
a: distance between the center of gravity and the center point between the front wheels
b: distance between the center of gravity and the center point between the rear wheels
$C_1$: cornering power of the two front wheels
$C_2$: cornering power of the two rear wheels
v: vehicle speed
T: first order lag time constant The third means determines the target steering angle by setting the position where the side slip angle becomes zero equal to a predetermined fixed position.

The distance $l_3$ is defined so that the position where the side slip angle of the vehicle becomes zero is in the vicinity of the rear wheel when the magnitude of the steered angle and the steered angular velocity of the steering wheel is small, and the position is near the front wheel when the magnitude of the steered angle and the steered angular velocity of the steering wheel is great, and so that said position is further adjusted according to variations in the turning circle when the steered angular acceleration of the steering wheel is great.

According to another aspect of the invention, there is provided an apparatus for controlling rear wheel steering angle for a vehicle which comprises a first sensing means for sensing a steered angle of a front wheel of the vehicle to provide signals indicative thereof, a second sensing means for sensing vehicle speed to provide a signal indicative thereof, a third means for determining a target steering angle for a rear wheel $\delta r$ with respect to said steered angle of the front wheel $\delta f$ according to the relation of $\delta r = (K = \tau \cdot S = \tau' \cdot S^2) \delta f$ based on the signals from said first sensing means and said second sensing means, and a fourth means for controlling an actual steering angle for the rear wheel according to said target steering angle $\delta r$ to achieve stable cornering. The signs K, $\tau$, S, and $\tau'$ are equal to the signals indicated above.

DESCRIPTION OF THE PREFERRED EMBODIMENT

Figure 1:
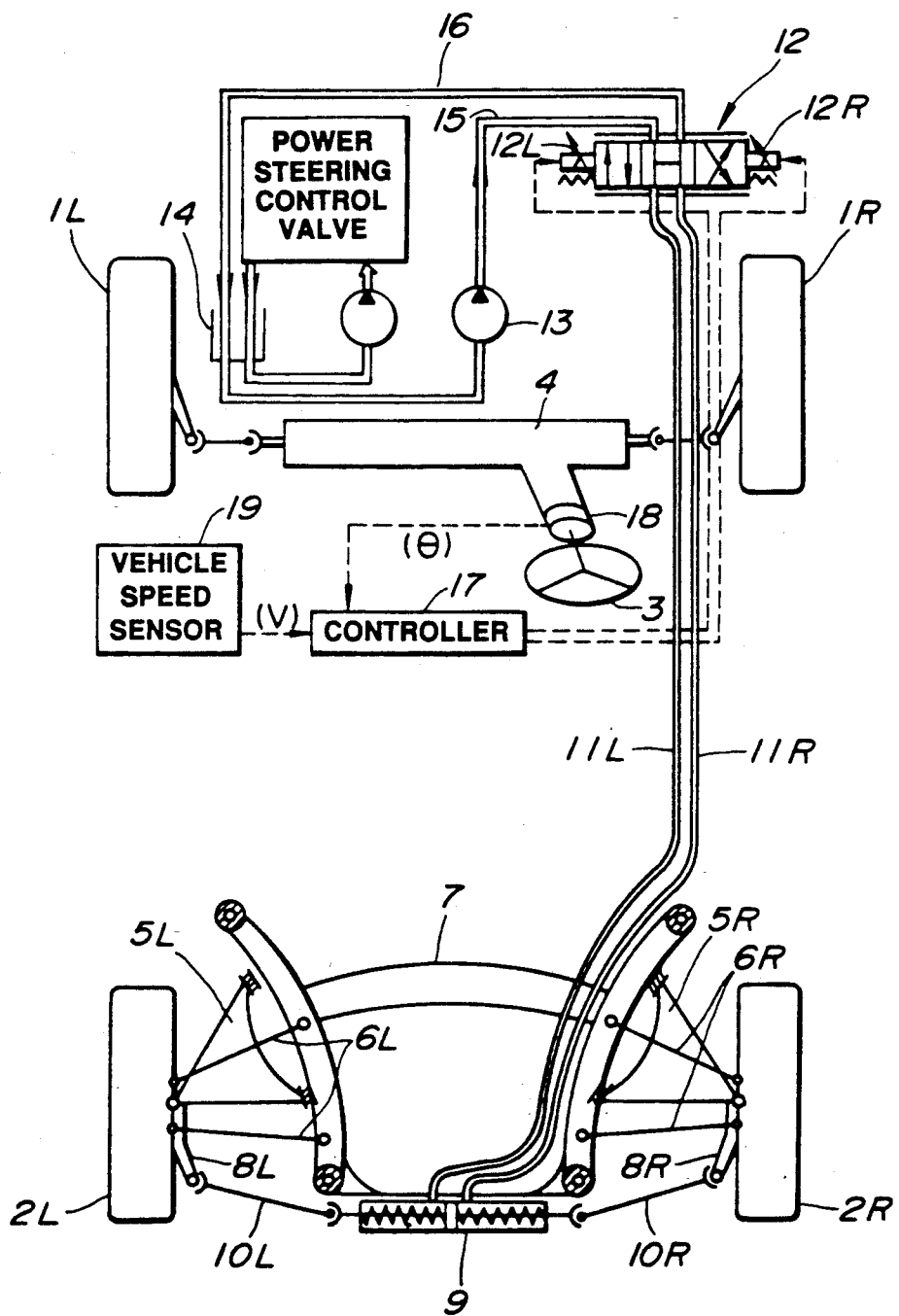
FIG. 1 is a schematic view which shows a system for controlling a rear wheel steering angle of a vehicle according to the present ivnenion.

Referring now to the drawings, particularly to FIG. 1, a system for controlling a steering angle for the rear wheels of a vehicle according to the instant invention is shown.

Front wheels 1L (left) and 1R (right) are rotatably connected to a steering wheel 3 via a steering gear 4. The rotation of the steering wheel 4 by an angle $\theta$ causes the front wheels to rotate by an angle $\delta f$. If a steering gear ratio is N, the relation between the $\theta$ and the $\delta f$ is expressed by $\delta f = \theta / N$. Rear wheels 2L and 2R are suspended by a rear suspension member 7 of a rear suspension system including transverse links 5L and 5R and upper arms 6L and 6R. An actuator 9 is provided which is connected between rear knuckle arms 8L and 8R through side rods 10L and 10R to steer the rear wheels 2L and 2R.

The actuator 9 is a spring centered double acting hydraulic pressure cylinder, which has two chambers, each connected to an electromagnetic proportional pressure control valve 12 through pressure lines 11L and 11R. The control valve 12 is connected to a pressure source including a hydraulic pump 13 and a reservoir tank 14 through a pressure line 15 and a drain line 16. This control valve 12 is a spring centered three position valve which is adapted for providing no pressure in the pressure line 11L and 11R when both solenoids 12L and 12R are in the OFF state and applying a working pressure to the pressure line 11R which is proportional to a period of time during the solenoid 12R is energized.

Figure 2:
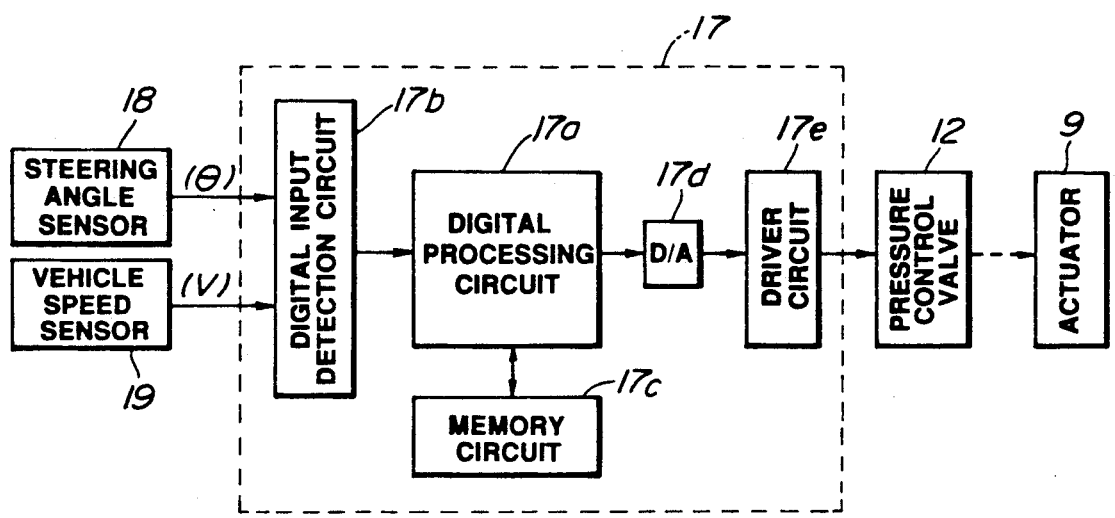
FIG. 2 is a block diagram which shows a rear wheel steering angle control system according to the invention.

A controller 17 electronically controls the switching operation and the energized time of the solenoids 12L and 12R. This controller 17, as shown in FIG. 2, generally comprises an arithmetic circuit 17a, a digital input signal detecting circuit 17b, a memory circuit 17c, a D/A converter 17d, and a drive circuit 17e. A steering angle sensor 18 and a vehicle speed sensor 19 are further provided. The steering angle sensor is adapted for sensing the steered angle $\theta$ of the steering wheel 3 to provide a digital signal to the digital input detecting circuit 17b. The vehicle speed sensor 19 is adapted for sensing vehicle speed V to provide a digital signal to the circuit 17b. Signals input from the sensors 18 and 19 cause the arithmetic circuit 17a to determine the $\theta$ and the V and to calculate the angular steering velocity $\dot\theta$ of the steering wheel and the angular steering acceleration $\ddot\theta$ thereof. Subsequently, based on the values of the $\theta$, the $\dot\theta$, the $\ddot\theta$, and the V, values K, a $\tau$, a $\tau'0$ which are previously calculated mathematically using equations as will be described hereinafter are retrieved from the memory circuit 17c. A control signal indicative of the steering angle mathematically calculated in a manner to be described hereinafter, is outputted to the solenoid of the pressure control valve 12 through the D/A converter 17d and the circuit drive 17e to control the working pressure for steering the rear wheels.

The controller 17 selectively determines as to whether a current i has to be supplied to the solenoids 12L or 12R of the control valve 12 based on the steered angle $\theta$ to provide a working pressure which corresponds to the current i i.e. a calculated rear wheel steering angle $\delta_r$ to the corresponding pressure lines 11L and 11R. This causes actuator 9 to be operated so as to allow the side rods 10L and 10R to be moved by a stroke corresponding to the pressure, steering the rear wheels by an angle corresponding to the mathematically calculated result.

Figure 3:
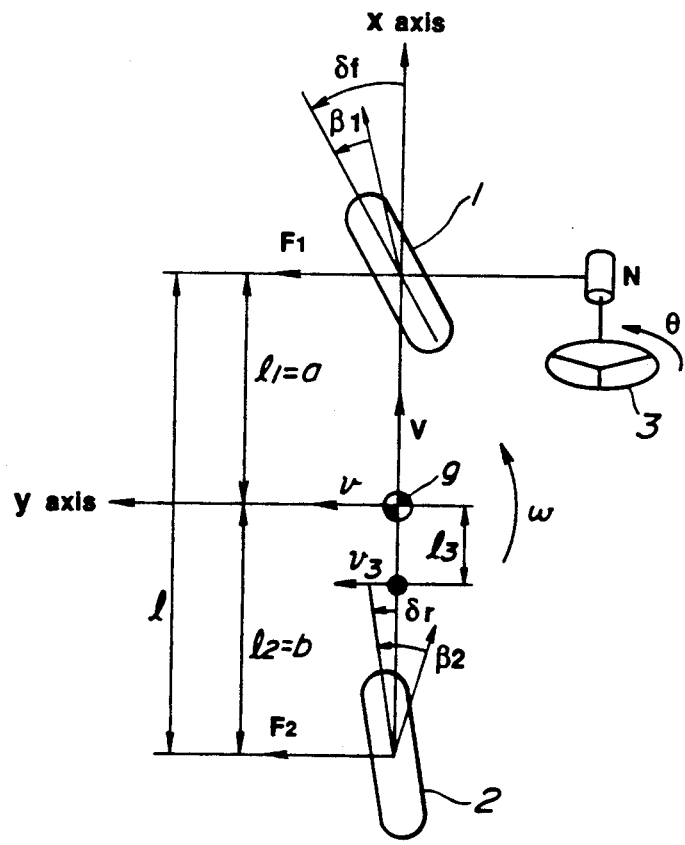
FIG. 3 which shows a two-wheeled vehicle, is an explanatory view for deriving an equation of motion.

Referring to FIG. 3, a model of a linear two degrees of freedom for obtaining an equation of motion to determine a target rear wheel steering angle is shown. If the equation of motion is transformed according to Laplace transformation, it is expressed as follows:

$$M(Sv + V\omega) = F_1 + F_2 \quad (1)$$

$$IS\omega = aF_1 - bF_2 \quad (2)$$

$$F_1 = C_1\beta_1 \quad (3)$$

$$F_2 = C_2\beta_2 \quad (4)$$

where
S: a Laplace's operator
M: a vehicle weight
I: a yawing moment of inertia
l: a wheel base
a: a distance between the center of gravity and the center point between the front wheels
b: a distance between the center of gravity and the center point between the rear wheels
$C_1$: cornering power of the two front wheels
$C_2$: cornering power of the two rear wheels
$\beta_1$: a side slip angle of a front wheel
$\beta_2$: a side slip angle of a rear wheel
V: vehicle speed
v: vehicle side speed
$\omega$: yaw rate $$\beta_1 = \delta_f - \frac{v + a\omega}{V} \quad (5)$$

$$\beta_2 = \delta_r - \frac{v - b\omega}{V} \quad (6)$$

where the $\delta f$ is the front wheel steered angle and the $\delta r$ is the rear wheel steering angle.

If side travel speed at a point away from the center of gravity by a distance $l_3$ is represented as a $v_3$, it is given as follows:

$$v_3 = v - l_3\omega \quad (7)$$

A rear wheel steering control function for steering the rear wheels is determined so that the side travel speed $v_3$ at a position away from the center of gravity by the distance $l_3$ becomes zero.

From $v_3 = 0$, $$v = l_3\omega \quad (8)$$

By substituting the equations (8) for the equation (1) through (6), the following equations are obtained.

$$Ml_3S\omega + MV\omega = F_1 + F_2$$

$$IS\omega = aF_1 - bF_2$$

$$F_1 = C_1\left\{ \delta_f - \frac{\omega}{V}(a + l_3) \right\}$$

$$F_2 = C_2\left\{ \delta_r - \frac{\omega}{V}(l_3 - b) \right\}$$

If according to the front wheel steered angle $\delta_f$, the rear wheel steering angle $\delta_r$ is controlled by using a transfer function G(S) which satisfies the relation of $\delta_r(S) = G(S) \delta_f(S)$, the G(S) can be obtained by using the above equations as follows:

$$M\omega(l_3S + V) = C_1\left( \delta_f - \frac{\omega}{V}(a + l_3) \right) +$$

$$C_2\left( \delta_fG - \frac{\omega}{V}(l_3 - b) \right)$$

-continued $$IS\omega = aC_1\left(\delta_f - \frac{\omega}{V}(a + l_3)\right) - bC_2\left(\delta_f G - \frac{\omega}{V}(l_3 - b)\right)$$

By arranging these equations with respect to the $\omega$ and the $\delta_f$, the following equations are obtained.

$$\left\{M(l_3G + V) + \frac{C_1(a + l_3) + C_2(l_3 - b)}{V}\right\}\omega =$$

$$(C_1 + C_2G)\delta_f$$

$$\left\{IS + \frac{aC_1(a + l_3) - bC_2(l_3 - b)}{V}\right\}\omega = (aC_1 - bC_2G)\delta_f$$

By replacing the left side terms { } with a A and a B respectively, the G can be expressed as follows:

$$(aC_1 - bC_2G)A = (C_1 + C_2G)B$$

$$G = \frac{aC_1A - C_1B}{bC_2A + C_2B}$$

A numerator of the $$G = aC_1A - C_1B$$

$$= aC_1\left\{M(l_3S + V) + \frac{C_1(a + l_3) + (C_2(l_3 - b)}{V}\right\} -$$

$$C_1\left\{IS + \frac{aC_1(a + l_3) + bC_2(l_3 - b)}{V}\right\}$$

$$= C_1\left\{(Mal_3 - I)S + MVa + \frac{C_2l(l_3 - b)}{V}\right\}$$

A denominator of the $$G = bC_2A + C_2B$$

$$= bC_1\left\{M(l_3S + V) + \frac{C_1(a + l_3) + (C_2(l_3 - b)}{V}\right\} +$$

$$C_2\left\{IS + \frac{aC_1(a + l_3) - bC_2(l_3 - b)}{V}\right\}$$

$$= C_2\left\{(Mal_3 + I)S + MVb + \frac{C_1l(a + l_3)}{V}\right\}$$

Thus, $$G(S) = \frac{C_1\{(Mal_3 - I)VS + MV^2a + C_2l(l_3 - b)\}}{C_2\{(Mbl_3 + I)VS + MV^2b + C_1l(a + l_3)\}} \quad (9)$$

It is convenient to use the signs K, T1, and T2, as follows:

$$K = C_1\{aMV^2 + C_2l(l_3 - b)\} / C_2\{bMV^2 + C_1l(l_3 - a)\}$$

$$T1 = C_1V(aMl_3 - I) / C_2\{bMV^2 + C_1l(l_3 + a)\}$$

$$T2 = V(bMl_3 + I) / bMV^2 + C_2l(l_3 + a)$$

By using K, T1, and T2, the equation (9) can be rewritten as follows:

$$\frac{\delta_r}{\delta_f} = \frac{K + T1 \cdot S}{1 + T2 \cdot S}$$

Thus, the rear wheel steering angle $\delta_r$ can be expressed as follows:

$$\delta_r = \frac{K + T1 \cdot S}{1 + T2 \cdot S}\delta_f = G(S) \cdot \delta_f$$

Figure 4:
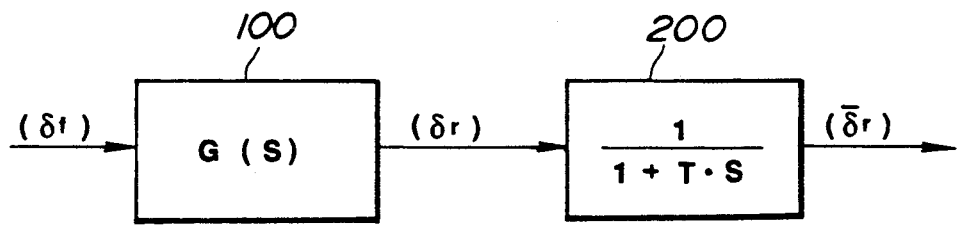
FIGS. 4 through 7 are block diagrams which show the relation between a controller for controlling a rear wheel steering angle and a hydraulic system for steering the rear wheels.

Referring to FIG. 4, a control system operating according to the above formula is shown. A controller 100 determines the rear wheel target steering angle $\delta_r$ mathematically using the above formula to control a hydraulic system 200 to actually steer the rear wheels by the angle $\bar{\delta}_r$. This control system is disclosed in a commonly owned copending application filed on Nov. 30, 1988, patent application Ser. No. 277,745, by Kazunori MORI et al, entitled REAR WHEEL STEER ANGLE CONTROL SYSTEM FOR VEHICLE. The contents of said disclosure being hereby incorporated by reference. In the control system, the hydraulic system 200 for steering the rear wheels provides a first order lag time constant T. Thus, the actual rear steered angle $\bar{\delta}_r$ does not exactly correspond to the mathematically calculated angle $\delta_r$. That is, the relation between the actual steered angle and the front wheel steered angle is given by the following equation.

$$\bar{\delta}_r = G(S)\frac{1}{1 + TS}\delta_f$$

It will thus be appreciated that the desired control can not be effected.

Additionally, the control function G(S) is a fractional expression of a linear expression / a linear expression with respect to the Laplace's operator S. Thus, the control system requires a digital filter and a high speed arithmetic unit. As a result, the cost of the system is increased.

Figure 5:
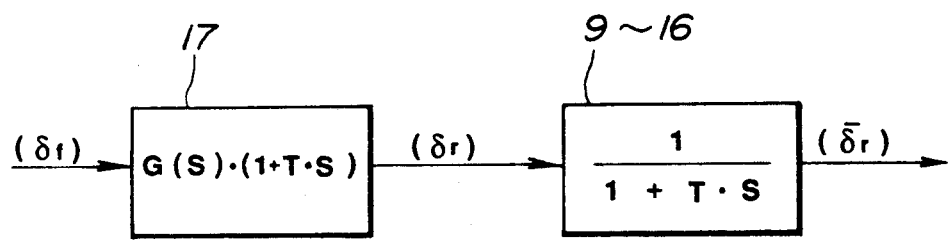
Figure 6:
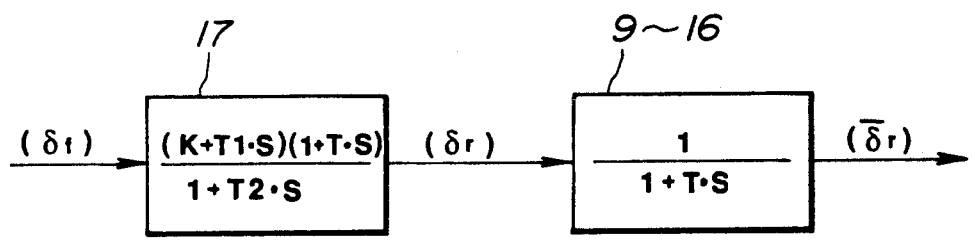
Figure 7:
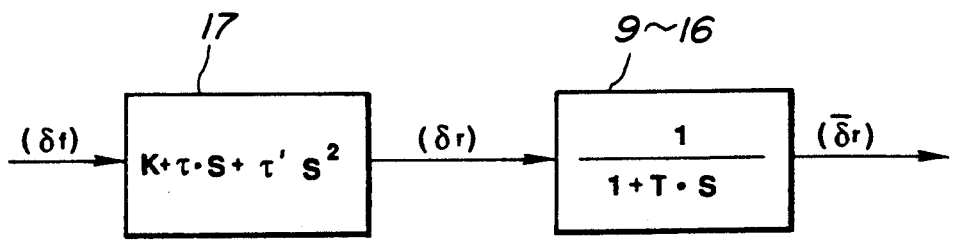

Referring to FIGS. 5 through 7, the control system according to the present invention is shown. The controller 17, according to the invention, is adapted for mathematically calculating the rear wheel steering angle $\delta_r$ so as to cancel the above value $1/1+T \cdot S$. As shown in FIG. 5, in the controller 17, the control function G(S) is multiplied by $(1+T \cdot S)$ and the resultant rear wheel steering angle $\delta_r$, as shown in FIG. 5, is determined so as to satisfy the following equation.

$$\frac{\delta_r}{\delta_f} = \frac{(K + T1 \cdot S)(1 + T \cdot S)}{1 + T2 \cdot S}$$

However, since the values of the T and T2 are extremely smaller than one, the above equation can be rewritten as follows:

$$\frac{\delta_r}{\delta_f} = (K + T1 \cdot S)(1 + T \cdot S)(1 - T2 \cdot S)$$

$$= \{K + T1 \cdot S\}\{1 + (T - T2)S\}$$

$$= K + \{T1 + K(T - T2)\}S + T1(T - T2)S^2$$

In the above equation, each the {T1+K(T−T2)} and the T1 (T−T2)S² are a control constant and thus if these values are replaced by a τ and a τ', the following equation obtains.

$$\frac{\delta_r}{\delta_f} = K + \tau \cdot S + \tau' \cdot S^2 \quad (10)$$

As shown in FIG. 7, the controller 17 can determined the rear wheel steering angle $\delta_r$ according to the above equation to control the rear wheel steering hydraulic system 300 (this includes parts indicated by numerals 9 through 16 in FIG. 1). It will be thus noted that an actual rear wheel steered angle $\delta_r$ can be obtained which corresponds to the mathematically calculated desired angle $\delta_r$, thereby achieving a desired degree of control unobtainable in the system indicated in FIG. 4. Further, since the above equation is not in the form of the fractional function of a linear expression / a linear expression, the digital filter and the high speed arithmetic unit are also unnecessary, reducing the manufacturing cost of the system.

Thus, the rear wheel steering angle is controlled by a system or apparatus including a first sensing means for sensing the following three parameters, a steered angle, steering angular velocity, and steered angular acceleration or deceleration of the vehicle steering wheel, and to provide signals indicative of these parameters; a second sensing means for sensing vehicle speed to provide a signal indicative thereof and a third means for determining a target steering angle for a rear wheel so as to vary the position when a side slip angle of the vehicle becomes zero with respect to the vehicle center of gravity based on signals from the first sensing means and the second sensing means.

When the rear wheel steering is controlled according to the above described equation (10), the distance $l_3$ which is, as mentioned previously, defined between the center of gravity of the vehicle and the position where the side slip angle becomes zero is varied based on the steered angle of the steering wheel $\theta$, the angular velocity of the steering wheel $\dot{\theta}$, and the angular acceleration of the steering wheel $\ddot{\theta}$ to determine the desired rear wheel steering angle $\delta_r$. Practically, it is preferable that the distance $l_3$ is determined according to data acquired by experimentation based on the specific vehicles or types thereof. For example, while a vehicle is running on a road having continuous gentle curves, the values of the $\theta$ and the $\dot{\theta}$ become small. Thus, a relatively long distance $l_3$ is provided, and the rear wheel steering angle can be determined so that the position where the side slip becomes zero is defined relatively near the rear wheels to improve the cornering stability. Additionally, when a vehicle is running on a road having continuous tight curves, the values of the $\theta$ and the $\dot{\theta}$ become relatively great. Thus, the distance $l_3$ is provided so that the position where the side slip becomes zero is defined relatively near the front wheels and the rear wheel steering angle is determined to improve the cornering stability. Further, when a vehicle is running on a mountain road on which a turning circle tends to vary, the value of the $\ddot{\theta}$ becomes great according to the variation. Thus, the distance $l_3$ is determined according to the variation of the turning circle to obtain a rear wheel steering angle so as to improve the cornering stability. It will be appreciated that the determination of the rear wheel steering angle based on the values of the $\theta$, the $\dot{\theta}$, or the $\ddot{\theta}$ can provide highly stable cornering.

As mentioned above, the control system according to the invention is adapted for determining the distance between the center of gravity and the position where side slip becomes zero based on the steered angle of a steering wheel, the angular velocity of steering thereof, or angular acceleration of steering thereof to control rear wheel steering angle. Therefore, the degree of freedom necessary for tuning a control constant for a rear wheel steering angle in order to improve the cornering properties of the vehicle increases and the responsiveness of the vehicle is improved relative to emergency handling to avoid danger and handling when the vehicle is slaloming. Additionally, high responsiveness can be obtained when the vehicle is running on a road in which the turing circle varies frequently.

What is claimed is:

1. An apparatus for controlling a rear wheel steering angle of a vehicle comprising:

first sensing means for sensing a steered angle, steered angular velocity, and steered angular acceleration of the steering wheel of the vehicle to provide signals indicative thereof;

second sensing means for sensing a vehicle speed to provide a signal indicative thereof;

third means for determining a target steering angle for a rear wheel so as to vary the position where the side slip angle of the vehicle becomes zero with respect to the vehicle's center of gravity based on the signals from said first sensing means and said second sensing means; and fourth means for controlling an actual steering angle for the rear wheel according to said target steering angle to achieve stable cornering.

2. An apparatus as set forth in claim 1, wherein said third means determines said target steering angle $\delta_r$ so as to satisfy the following relation with respect to a steered angle $\delta f$ of the front wheel, $$\delta r/\delta f = K + \tau \cdot S + \tau' \cdot S^2$$

where
S: a Laplace's operator
$K = C_1\{aMV^2 + C_2l(l_3 - b)\}/C_2\{bMV^2 + C_1l(l_3 - a)\}$
$\tau = T1 + K(T - T2)$
$T' = T1(T - T2)$
$T1 = C_1V(aMl_3 - 1)/C_2\{bMV^2 + C_1l(l_3 + a)\}$
$T2 = V(bMl_3 = I)/bMV^2 = C_2l(l_3 + a)$
M: vehicle weight
I: yaw moment of inertia
l: wheel base
$l_3$: distance between the center of gravity and a position where the lateral slip angle becomes zero
a: distance between the center of gravity and the center point between the front wheels
b: distance between the center of gravity and the center point between the rear wheels
$C_1$: cornering power of the two front wheels
$C_2$: cornering power of the two rear wheels
V: vehicle speed
T: first order lag time constant 3. An apparatus as set forth in claim 1, wherein said third means determines said target steering angle by setting said position where the side slip angle becomes zero equal to a predetermined fixed position.

4. An apparatus as set forth in claim 1, wherein said position where the side slip angle of the vehicle becomes zero is defined in the vicinity of the rear wheel when the magnitude of the steered angle and the steered angular velocity of the steering wheel is small, said position being defined near the front wheel when the magnitude of the steered angle and the steered angular velocity of the steering wheel is great, and said position being defined according to variations in a turning circle when the steered angular acceleration of the steering wheel is great.

5. An apparatus as set forth in claim 2, wherein said distance $l_3$ is defined so that said position where the side slip angle of the vehicle becomes zero with respect to the center of gravity is in the vicinity of the rear wheel when the magnitude of the steered angle and the steered angular velocity of the steering wheel is small, and said position is near the front wheel when the magnitude of the steered angle and the steered angular velocity of the steering wheel is great, and so that said position is set according to variations in a turning circle when the steered angular acceleration of the steering wheel is great.

6. An apparatus for controlling rear wheel steering for a vehicle comprising:
   first means for determining first, second and third parameters associated with the respective steered angle, steering velocity, and acceleration of an angular displacement of a steering wheel of the vehicle, to provide signals indicative of each thereof, the third parameter relating to the steered angular acceleration of the steering wheel of the vehicle;
   second means for determining vehicle speed and provide a signal indicative thereof;
   third means for determining a rear wheel steering angle so as to vary an interval, between a position where the side slip angle of the vehicle becomes zero and the vehicle's center of gravity, in a preselected relation to the first and second parameters and the vehicle speed, said position being further variably dependent upon the third parameter to provide a rear wheel target steering angle; and
   fourth means for controlling an actual steering angle for the rear wheels according to the rear wheel target steering angle.

7. An apparatus as set forth in claim 6, wherein said third means determines the rear wheel target steering angle, so as to compensate for a lag time due to a delay of hydraulic response of an actuator for steering the rear wheels.

8. An apparatus as set forth in claim 7, wherein said third means determines the rear wheel target steering angle $\delta r$ with respect to a steered angle $\delta f$ of front wheels corresponding to the steered angle of the steering wheel according to the following relation $$\delta r/\delta f = K + \tau S + \tau' S^2$$

where
S: a Laplace operator
$K = C_1\{aMV^2 + C_2 l(l_3-b)\} C_2 \{bMV^2 + C_1 l(l_3-a)\}$
$\tau = T1 + K(T - T2)$
$T' = T1(T - T2)$
$T1 = C_1 V(aMl_3 - 1)/C_2\{bMV^2 + C_1 l (l_3+a)\}$
$T2 = V(bMl_3 = I)/bMV^2 = C_2 l(l_3+a)$
M: vehicle weight
I: yaw moment of inertia
l: wheel base
$l_3$: distance between the center of gravity and a position where the lateral slip angle becomes zero
a: distance between the center of gravity and the center point between the front wheels
b: distance between the center of gravity and the center point between the rear wheels
$C_1$: cornering power of the two front wheels
$C_2$: cornering power of the two rear wheels
V: vehicle speed
T: first order lag time constant.

* * * * *